United States Patent [19]

Cronfel

[11] 4,234,008
[45] Nov. 18, 1980

[54] FLUID CHOKE

[76] Inventor: Ramsey L. Cronfel, 725 Parkview Cir., Elk Grove Village, Ill. 60007

[21] Appl. No.: 936,330

[22] Filed: Aug. 24, 1978

[51] Int. Cl.$^2$ .............................................. F16T 1/00
[52] U.S. Cl. .................................. 137/182; 137/203; 138/44
[58] Field of Search .................. 137/203, 182; 138/42, 138/44, 41

[56] References Cited

U.S. PATENT DOCUMENTS

| 583,394 | 5/1897 | Brainerd | 137/182 |
|---|---|---|---|
| 722,650 | 3/1903 | Brainerd | 137/182 |
| 2,501,593 | 3/1950 | Becker | 138/44 |
| 2,726,072 | 12/1955 | Hermann | 138/42 X |
| 3,072,261 | 1/1963 | Smith | 138/42 X |
| 3,894,562 | 7/1975 | Mosley | 138/44 |
| 3,921,672 | 11/1975 | Arnold | 138/44 |

Primary Examiner—Alan Cohan
Attorney, Agent, or Firm—Dillis V. Allen

[57] ABSTRACT

A fluid choke for controlling fluid flow, such as condensate draining from a high pressure steam line, that does not require the use of any separate filters and constructed entirely from a section of bar stock including a reduced diameter inlet section having a small orifice extending axially therethrough with a plurality of radially extending openings from the orifice to its outer diameter to prevent the accumulation of foreign matter in the orifice, and a larger diameter outlet section having a larger diameter and longer orifice extending axially therethrough communicating with the inlet section orifice that serves to provide a pressure drop permitting the inlet section orifice to be somewhat larger in diameter, further reducing the possibility of foreign matter accumulation in the inlet orifice section and also reducing the amount of flashing in the inlet section.

8 Claims, 4 Drawing Figures

FLUID CHOKE

BACKGROUND OF THE PRESENT INVENTION

Steam generating systems inherently produce condensate in high pressure lines that must be removed to prevent erosion, corrosion, and other damage to the system. The removal of this condensate from high pressure steam systems by known methods inevitably results in a heat loss to the system and efforts have been made to reduce the magnitude of this loss to increase the efficiency of the system and conserve energy.

For many years steam traps have been employed for this purpose, but because they malfunction frequently and do not exert any significant back pressure on the system, they permit an excessive amount of live high pressure steam to escape to drain where it condenses without producing any work resulting in a significant system loss. Moreover the filters commonly associated with these traps provide a frequent source for the entrapment of foreign material and require periodic cleaning and replacement.

The field of the invention relates to the art of restricting the flow of water and other liquids by the means of providing a fixed restriction in a conduit. As is well known in the art, choking of liquid flow through a restriction can be achieved by accelerating the liquid to that velocity at which it flashes into a two phase mixture of liquid and vapor. The mixture can thus achieve a velocity equal to the speed of sound in the mixture. When sonic velocity has been obtained, the flow rate no longer depends on the downstream pressure, but only on the upstream pressure. This phenomena is known as sonic choke. Such a device has useful application in many areas such as where condensate is to be removed from steam heating systems.

The principles of gaseous (compressible) choked flow have been understood for some time, and more recently the principles of two phase choked flow have also been formulated.

In order to achieve choked flow in a liquid, the restriction must be relatively small. Although there is no theoretical limit to how small the restriction can be made to obtain a certain flow, it is well known that if a restriction is too small, it will become plugged by impurities in the fluid. In addition it is well known that a flashing liquid is very erosive to such restrictions.

There have been two general approaches that have been taken to overcome the risk of plugging, or to lessen the effects of erosive forces:

(a) Instead of one very small restriction, larger, multiple restrictions are provided to break the pressure in more than one step. This is the approach taken by Self in U.S. Pat. No. 3,954,124, by Kuehn in U.S. Pat. No. 3,983,903, and by Voorheis in U.S. Pat. No. 3,409,382.

(b) A single, small restriction is provided but with a protective screen in front of the restriction. This is the approach taken by Wonderland in U.S. Pat. No. 3,887,895, Lee in U.S. Pat. No. 3,109,459, Mannion in U.S. Pat. No. 3,668,822, and Kasten in U.S. Pat. No. 2,635,641.

The disadvantage of design (a) above is that it is a relatively complex, costly device to manufacture and install. It is also difficult to disassemble for inspection and maintenance. It is also difficult to resize this device in the field should the need arise.

The disadvantages of design (b) above is that the screen itself is somewhat fragile and is subject to damage by erosion or corrosion. Furthermore, the screen openings are so small that they are prone to plugging. Another disadvantage is that this type of device is normally attached by gasketing or threading and runs the risk of leaking to the atmosphere. The devices requiring gaskets (such as U.S. Pat. No. 3,887,895) also require an inventory of the gaskets which must be replaced periodically and/or at each inspection. Another disadvantage of this type of device is that a single, thin orifice plate (U.S. Pat. No. 3,877,895) is vulnerable to the erosive forces.

SUMMARY OF THE PRESENT INVENTION

According to the present invention, a fluid choke of improved design is provided for the condensate drain line of a steam system that does not require any filters.

The fluid choke according to the present invention is a simple one-piece part that is connected in the condensate drain line by two union couplings. This one-piece member has a reduced outer diameter inlet section that permits flow around its outside. There is a small diameter entrance orifice extending through this inlet section to a main calibrated inlet orifice where a major part of the pressure drop of the choke is achieved. A plurality of radially extending holes extend between this entrance orifice and the outer diameter of the inlet section so that high pressure steam flows radially inwardly through these holes into the orifice greatly reducing the possibility of foreign matter accumulation in the orifice itself. The filter holes are sized to stop particles that would plug the main inlet orifice, while allowing particles to pass that would not plug the main restriction. To do this, the filter holes are sized only slightly smaller than the entrance orifice and the main inlet orifice. This assists in eliminating the requirement for any filters in the present choke, which in prior art constructions require frequent cleaning or replacing.

The other end of this one-piece member has an enlarged outer diameter that constitutes the outlet section of the choke and this has a constant diameter orifice therethrough larger than the inlet orifice. The outlet section has a much greater length than the inlet section, but it creates a significant enough pressure drop therein to permit the inlet orifice to be somewhat larger than would otherwise be required and thus further reduce the possibility of foreign matter accumulation in the inlet section orifice. It also controls the amount of flashing at the exit of the main inlet orifice, thus avoiding severe erosion of the main orifice.

This one-piece fluid choke construction eliminates noise and vibration found in the prior art multiple part constructions described above in the background of the invention. The elimination of this prior art multiple part construction also adds significantly to the reliability of the device, reduces maintenance and significantly reduces the possibility of orifice plugging.

It is another object of this invention to provide the fluid choke that is connected to the associated conduit with the use of standard unions, thus avoiding the use of replaceable gaskets, and providing a simplified method of disassembly and reassembly for inspection and maintenance.

The fluid choke according to the present invention also provides a novel combination when installed in parallel with a steam trap so that the steam trap is employed during system start-up and the choke is employed during steady-state operation of the system.

DETAILED DESCRIPTION OF THE PREFERRED EMBODIMENTS

Figure 1:
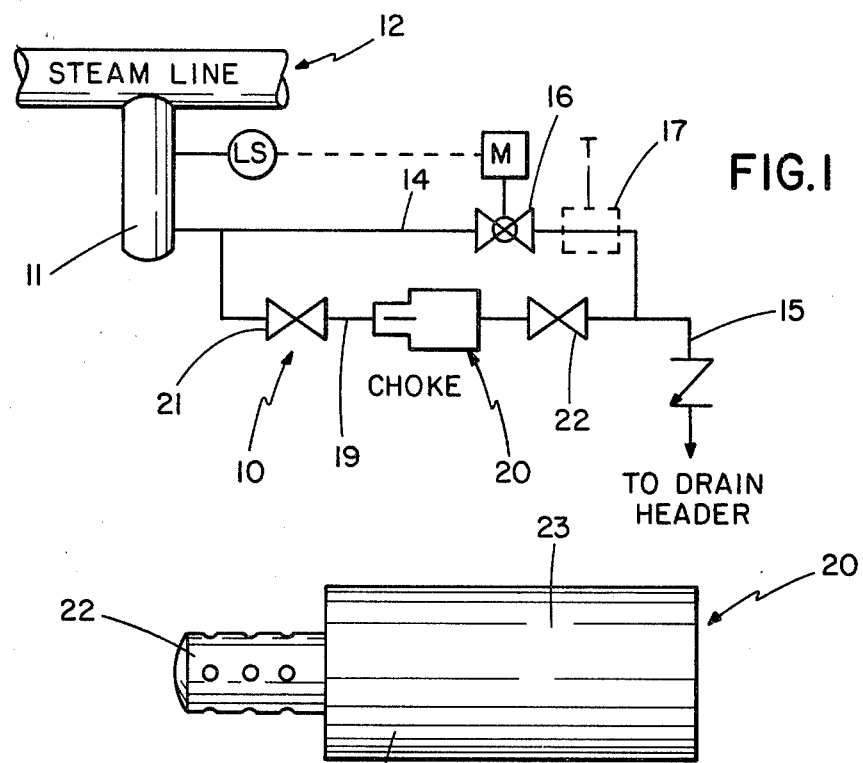
FIG. 1 shows a condensate parallel drain system according to the present invention having a bypass line for system start-up and a steady-state line having a fluid choke therein.

Referring to the drawings, and particularly FIG. 1, a condensate drain system 10 is illustrated which is connected by inlet pipe 11 to a high pressure steam line 12 in a manner to drain condensate from the steam line both during start-up of the associated steam system and during steady-state operation. A bypass line 14 is provided for draining condensate to a drain header line 15 during start-up through automatic valve 16. If desired, a conventional steam trap 17 may be provided downstream of the valve 16 in bypass line 14 which is sized to accommodate condensate flow rates during start-up of the associated steam system.

A parallel steady-state drain line 19 is provided for draining condensate during steady-state operation of the associated steam system. This line has a fluid choke 20 identical to that shown in FIGS. 2 through 4 flanked by valves 21 and 22. While the choke 20 can provide a superior condensate system when used alone, for very high pressure applications the parallel arrangement of choke 20 and trap 17 provides a more effective system reducing trap maintenance and saving energy.

Figure 2:
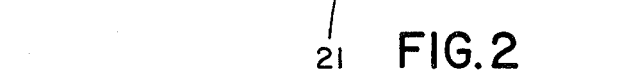
FIG. 2 is an enlarged plan view of the present fluid choke.
Figure 3:
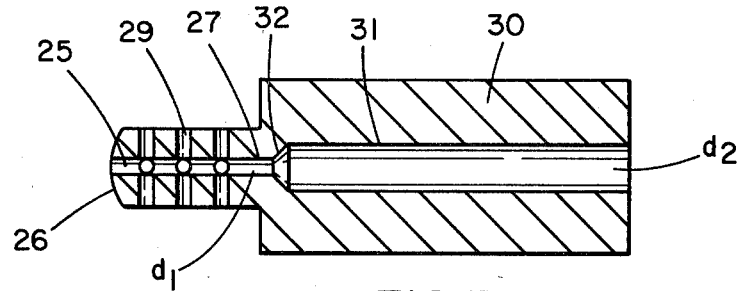
FIG. 3 is a cross-section of the fluid choke shown in FIG. 2.
Figure 4:
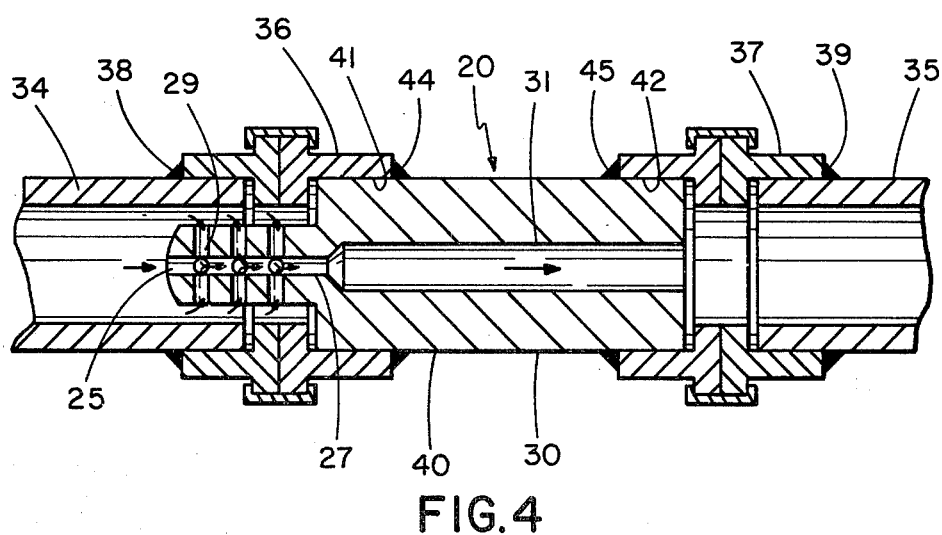
FIG. 4 illustrates the fluid choke mounted within a condensate drain line by two union-type couplings.

As seen in FIGS. 2 through 4, fluid choke 20 consists of a single body 21a composed of a reduced diameter cylinder 22 defining an inlet section of the choke and an enlarged diameter portion 23 that defines the outlet section of the choke. An approach or inlet orifice 25 is drilled into the axial centerline of inlet section 22 through a convex frontal surface 26. The inlet 25 communicates with a precision drilled, precalibrated orifice section 27.

It should be noted that orifice 27 is relatively long being on the order of ½ inch so that unlike a thin plate orifice, it will not deteriorate when subjected to the erosive forces of flashing condensate.

A system of filter holes 29 are drilled into the inlet section and they lie in planes spaced 90 degrees apart, as shown clearly in the drawings. The filter holes 29 are slightly smaller than orifices 25 and 27 and this is an important aspect of the present invention. If the filter holes 29 are larger than the inlet orifices 25 or 27, they will allow impurities to pass which would plug the restriction. If the filter holes 29 are extremely smaller than orifice 25 they will themselves be plugged and significantly reduce the flow through the choke below the desired value. The larger outlet section 30 of the choke has an axially extending orifice 31 having a diameter $d_2$ substantially greater than the diameter $d_1$ of orifice 27.

It should be noted that the axial length of orifice 31 is substantially greater than the length of inlet orifice 27 so that it protects orifice 27 from erosion by preventing the fluid from totally reexpanding until it exits from the fluid choke, and thus the flashing forces are kept away from the orifice 27.

A further purpose in the elongated outlet orifice 31 is to reduce the required pressure drop across orifice 27. This relationship is defined by the equation $\Delta P_1/\Delta P_2 = (d_2/d_1)^4$ where $P_1$ = pressure drop across inlet orifice 27 where $P_2$ = pressure drop across outlet orifice 31

This permits the orifice 27 to be somewhat larger than if it were the only orifice in the choke, thereby further reducing the likelihood of plugging. The outlet orifice 31 is connected to inlet orifice 27 by a conical surface 32.

In FIG. 4 fluid choke 20 is shown connected between an inlet pipe 34 and an outlet pipe 35 by unions 36 and 37 which are welded as at 38 and 39 to the pipes. Choke 20 is sized so that the outer diameter 40 of the outlet section 30 fits within union openings 41 and 42 and is welded thereto as illustrated at 44 and 45, providing a gasketless connection with drain pipes 34 and 35.

In operation the fluid enters the choke 20 through both approach orifice 25 and filter holes 29 but all of the fluid passes through inlet orifice 27. The orifice 27 provides a definite and known fixed resistance to fluid flow. Thereafter the fluid expands somewhat in outlet section orifice 31 before completely expanding in outlet pipe 35.

What is claimed is:

1. A fluid choke assembly for controlling pressurized fluid flow comprising: an inlet pipe and an outlet pipe, a one-piece choke member having an elongated inlet section having an outer diameter significantly less than the inner diameter of the inlet pipe, an axial orifice extending through the inlet section having a substantially constant diameter, means for reducing the collection of foreign material in the inlet section orifice including a plurality of generally radial openings extending from the orifice to the outer diameter of the inlet section, said choke member having an outlet section communicating with the outlet pipe, said outlet section having a substantially constant diameter orifice extending therethrough communicating with the inlet section orifice, said outlet section orifice being of greater diameter than the inlet section orifice, said outlet section having a first end adjacent the inlet section and a second end opposite the first end, a first coupling member connecting first end to the inlet pipe, and a separate second coupling member connecting the second end of the outlet section defines the outer diameter of part of the assembly.

2. A fluid choke assembly for controlling pressurized fluid flow, as claimed in claim 1, wherein said inlet section projects within the inlet pipe to reduce the length of the assembly.

3. A fluid choke assembly for controlling pressurized fluid flow, comprising: an inlet pipe and an outlet pipe that does not require the use of any separate filters, a unitary one-piece member of cylindrical construction, said member having a reduced diameter inlet end and an enlarged diamter outlet end, the inlet end diamter being substantially less than the inlet pipe inside diameter to permit flow therearound, a substantially constant diameter orifice in the inlet section extending axially therethrough, a plurality of radially extending apertures in the inlet end between the orifice and the outer diameter thereof, the outlet end having an orifice therethrough communicating with the inlet end orifice and having a diameter substantially larger than the diameter of the inlet end orifice, a first coupler connecting one end of the outlet end to the inlet pipe, and a second separate coupler connecting the other end of the outlet end to the outlet pipe so that at least a portion of the outlet end of the one-piece member defines the entire radial part of at least a length of the assembly.

4. A fluid choke assembly for controlling pressurized fluid flow as claimed in claim 3 wherein the outlet section is substantially larger in outer diameter than the inlet section.

5. A fluid choke assembly for controlling pressurized fluid flow as claimed in claim 3 wherein said apertures are radially extending holes positioned in planes spaced 90 degrees apart around the inlet section.

6. A condensate drain system for a steam system having a high pressure steam line, a first bypass drain line connected to the inlet line having a trap therein for draining during system start-up, a second drain line connected to the inlet line for steady-state drain, said second drain line having an inlet pipe and an outlet pipe with a choke therebetween, said choke having an inlet section with an outer diameter substantially less than the inner diameter of the second drain line, an orifice through the inlet section, a plurality of apertures between the orifice and the outer diameter of the inlet section to eliminate the need for any filters with the choke, an outlet section having a first end adjacent the inlet section and a second end opposite the first end, a first coupling member connecting the first end to the inlet pipe, and a separate second coupling member connecting the second end of the outlet section to the outlet pipe so that the outlet section defines the outer diameter of part of the assembly.

7. A choke assembly for controlling pressurized fluid flow, comprising: an inlet pipe, an outlet pipe, a unitary choke member having a cylindrical construction, said choke member having a reduced diameter inlet section substantially smaller than the inside diameter of the inlet pipe to permit flow around the inlet section inside the inlet pipe, said choke member having an enlarged diameter outlet section substantially the same diameter as the outer diameter of both the inlet pipe and the oulet pipe, a substantially constant diameter orifice extending completely axially through the inlet section, a plurality of generally radially extending apertures in the inlet section between the orifice and the outer diameter thereof, said inlet section projecting substantially within the inlet pipe, said enlarged diameter outlet section having a length somewhat less than the space between the inlet pipe and the outlet pipe and positioned substantially equal distances from both, a first coupler connecting one end of the outlet section of the choke member to the inlet pipe, and a separate coupler connecting the other end of the outlet section to the outlet pipe so that the outlet section forms parts of the outside length of the entire assembly.

8. A fluid choke assembly for controlling pressurized fluid flow as claimed in claim 7 wherein said apertures are slightly smaller than the orifice.

* * * * *